United States Patent [19]

Thomason et al.

[11] 4,146,011
[45] Mar. 27, 1979

[54] SOLAR ENERGY

[75] Inventors: Harry E. Thomason; Harry J. L. Thomason, Jr., both of 609 Cedar Ave., Fort Washington, Md. 20022; Quock G. Loo, Dunkirk, Md.

[73] Assignees: Harry E. Thomason, Fort Washington, Md.; Harry J. Thomason, Jr., Fort Washington, Md.

[21] Appl. No.: 683,038

[22] Filed: May 4, 1976

[51] Int. Cl.² ............................................. F24J 3/02
[52] U.S. Cl. ............................................. 126/271
[58] Field of Search ............... 126/270, 271; 237/1 A; 165/170, 171, 172

[56] References Cited

U.S. PATENT DOCUMENTS

| 3,239,000 | 3/1966 | Meagher | 126/271 |
|---|---|---|---|
| 3,270,739 | 9/1966 | Thomason | 126/271 |
| 3,934,323 | 1/1976 | Ford et al. | 126/271 |
| 3,989,031 | 11/1976 | Thomason et al. | 126/271 |
| 3,991,742 | 11/1976 | Gerber | 126/271 |

Primary Examiner—Kenneth W. Sprague
Assistant Examiner—James C. Yeung

[57] ABSTRACT

For the simple Thomason "SOLARIS" heat collector, a simple outlet is used that requires a drop-outlet nipple with a U-slotted top end, and sealant to avoid escape of liquid or steam (vapor).

In a modification, only one drop outlet is used for two "SOLARIS" panels, thus cutting the cost even further.

In another modification a slotted, sloping pipe serves as an outlet and drain.

7 Claims, 5 Drawing Figures

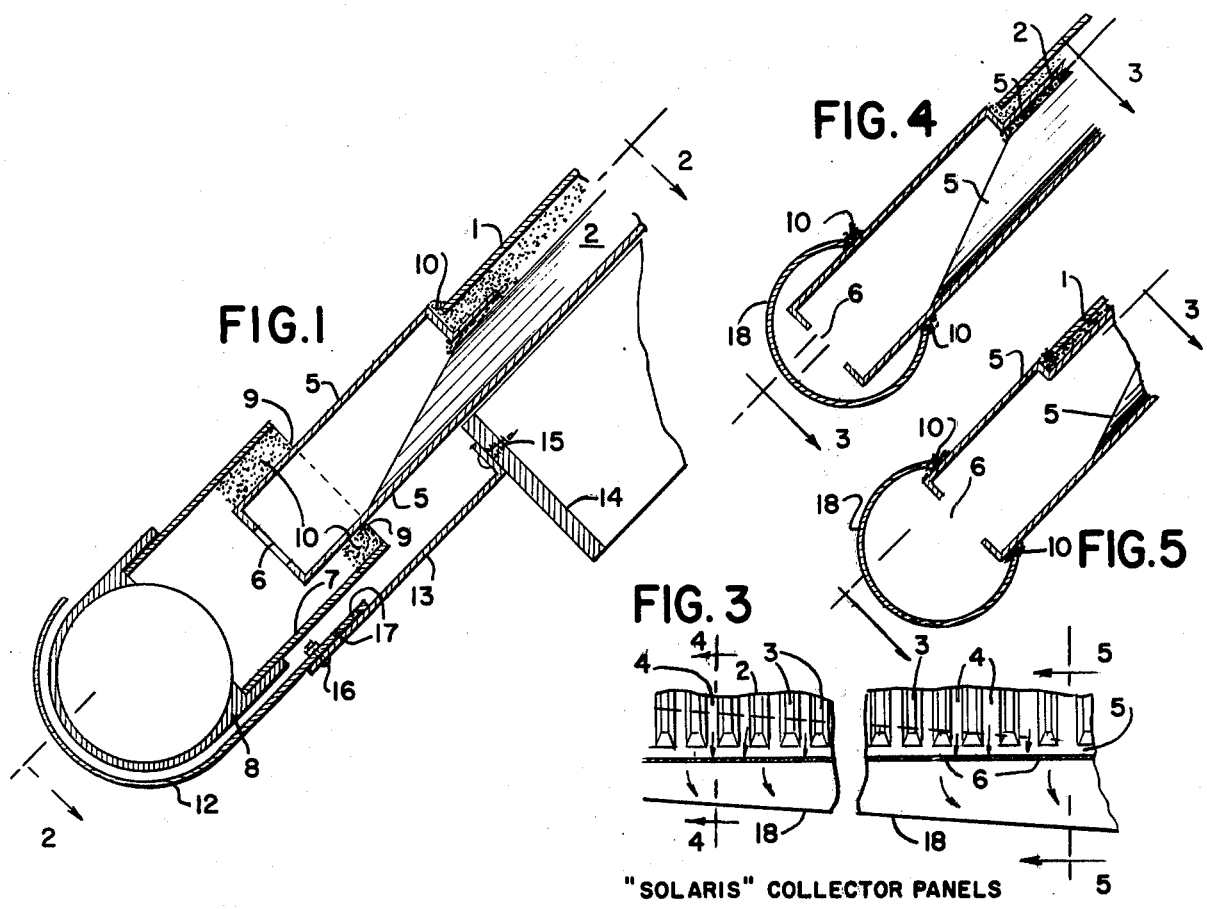
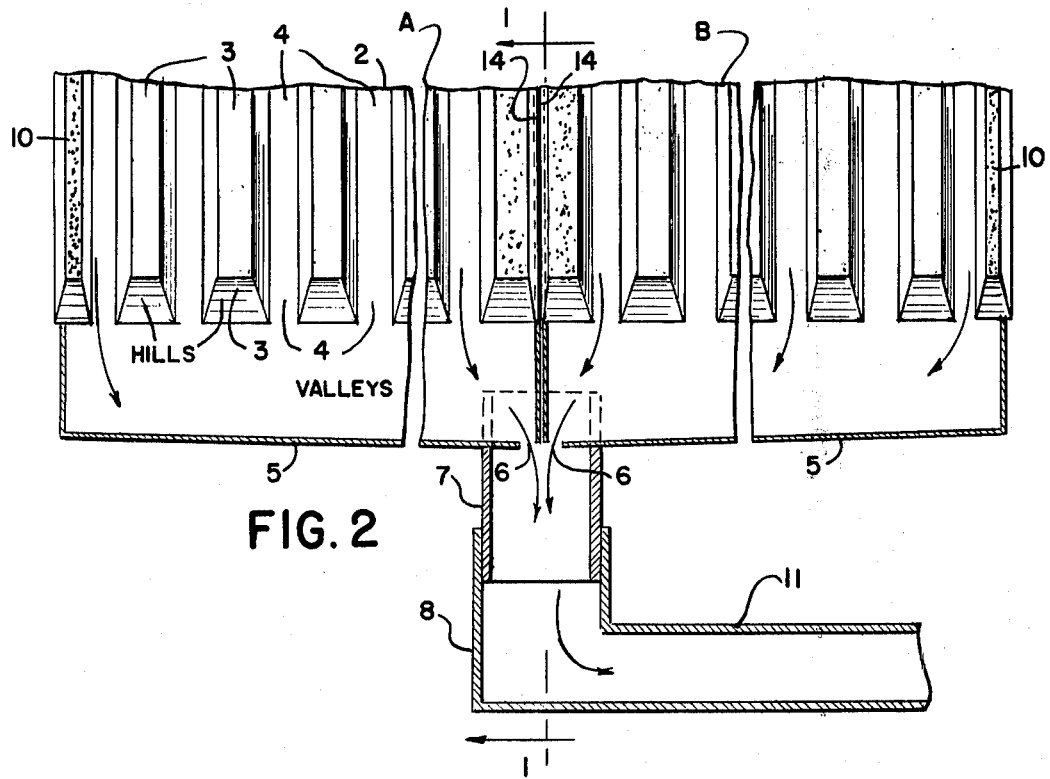
"SOLARIS" COLLECTOR PANELS

SOLAR ENERGY

BACKGROUND

In Thomason patents, such as U.S. Pat. No. 3,145,707 and 3,215,134, the low-cost open-flow (trickle-flow) collector yielded simple, low-cost solar heat collection. Quality was improved and high efficiency was achieved in the solar heat collector panel of Thomason U.S. Pat. No. 3,989,031, tested at the University of Virginia by Dr. J. Taylor Beard, et al., under a Federal Government contract from ERDA. However, improvement was needed as to the liquid outlet from the collector panel. The present invention helps improve the open-flow (trickle-flow) Thomason solar collector panel.

IN THE DRAWING

FIG. 1 is a cross section along line 1—1 of FIG. 2.

FIG. 2 is a plan-cross sectional view along line 2—2 of FIG. 1.

FIG. 3 is a plan-cross sectional view of a modification along line 3—3 of FIGS. 4 and 5.

FIGS. 4 and 5 are cross sectional views along lines 4—4 and 5—5 of FIG. 3.

A cross-section through the lower end of an open-flow (trickle-flow) "SOLARIS" heat collector is illustrated in FIG. 1. Glazing 1 (glass, for example) covers the solar heat collecting (absorber) sheet 2. Sheet 2 is corrugated, or V-crimped, or otherwise formed with hills and valleys as taught in the basic Thomason patents referenced above. Sheet 2 has hills 3 and valleys 4 running from top-to-bottom. In one pattern commonly used the tops of the hills and the bottoms of the valleys are both substantially flat. Water or other fluid flows in the flat valleys 4. It is brought in by a perforated distributor pipe at the top of the collector panel. It flows out through a collector manifold or gutter trough 5. That manifold is sometimes called a transition area, or a transition piece attached to the bottom of a corrugated collector sheet (see Pat. No. 3,989,031). The flat valleys are embossed for better spreading of the water.

The collector manifold or gutter trough 5 has an outlet hole 6 for water or other fluid out into an outlet conduit, such as a nipple 7, into a Tee or EL (elbow) 8. Nipple 7 is cut out at its top with a generally U-shaped cut 9. Nipple 7 is then slipped up around collector trough 5 and sealed with an adhesive-sealant 10 (G.E. Silicone, for example). Tee or EL 8 connects to return line 11 to channel solar heated fluid to a point of use or storage.

It would be possible to eliminate nipple 7 and cut a U-shaped slot in the top end of Tee or EL 8.

Although adhesive-sealant 10 has an ability to seal and also secure the parts together, a J-shaped adjustable support 12 may be used, secured to strap 13 which, in turn, is secured to support member 14 by screw or bolt 15. Bolt 16 and bolt-holes 17 provide for adjustment of J-shaped support 12. Thus, if liquid is used, pipe 11 may be installed and set at the desired height and slope for drainage, and held in place while adhesive-sealant 10 is applied and sets up. Support (or supports) 12 also help support the weight of pipe 11 and the water or other fluid therein. The adhesive-sealant preferably remains semi-soft. This permits slight relative movement of parts during heating due to solar energy during the day and cooling at night.

FIG. 2 illustrates a pair of "SOLARIS" panels A and B side-by-side. Panel A, on the left, drains toward outlet 6 at its right side. Panel B, on the right, drains toward outlet 6 at its left side. Thus, a single drop outlet 7 and a single EL 8 serve two "SOLARIS" panels. And, the cost is cut to only one-half. (If desired, the drop outlet 6 could be at the center of a panel, with one drop outlet for each "SOLARIS" panel.)

FIGS. 3, 4 and 5 illustrate a modification wherein a slotted trough or pipe 18 receives heated fluid from transition piece 5. Instead of one outlet 6, multiple outlets may be used. The slotted pipe 18 may be sloped, as illustrated, to facilitate flow of fluid. Adhesive-sealant 10 may be used along the edges of the slot to assure a seal to transition piece 5. Supports, such as 12-17 in FIG. 1 may be used if desired.

So, use of the present invention means a better, more reliable product, at lower cost. Typically, from four to 16 "SOLARIS" panels should be used for a solar heated home. A saving of $3 to $5 per panel means a cost reduction of $12 to $80 per "SOLARIS" home-heating system. For a large building, such as an office building, an apartment building, or such, the saving could be hundreds of dollars.

Yes, simplicity is the height of invention.

We claim:

1. For use with solar heat collector panels of the type having a top end and a bottom end with a solar heat absorber sheet having hills and valleys to channel streams of liquid flowing from the top to the bottom, a transition area or piece at the bottom end of said absorber sheet to change the absorber hills and valleys into a flattened section which is formed into a manifold to receive the streams of liquid, outlet means from said manifold for solar-warmed liquid, trough-like means to catch the liquid from a plurality of outlet means and channel the combined streams into a single for return to a point of use or storage, said trough-like means comprising an open-top member for complete draindown when the liquid ceases to flow and channeling the liquid from all outlets down to a single stream, said open-top trough-like member being supported immediately below said plurality of outlet means for downward gravity-feed.

2. Apparatus as in claim 1 and an additional collector manifold, outlets from said manifolds adjacent to each other, the edges of said conduit slot and said manifolds nesting together in close proximity to one another with the outlets from said manifolds in fluid communication with said conduit, said sealant means providing a substantially tight seal between the manifolds and outlet.

3. Apparatus as in claim 2, said collector manifolds sloping toward said conduit.

4. Apparatus as in claim 3, said manifolds sloping in opposite directions, each sloping toward said conduit.

5. Apparatus as in claim 1 and a member supporting said conduit in relation to said manifold.

6. Apparatus as in claim 5 and means for adjusting said supporting member.

7. Apparatus as in claim 1 wherein said trough comprises a slotted pipe.

* * * * *